United States Patent
Granat et al.

(10) Patent No.: US 8,275,360 B2
(45) Date of Patent: Sep. 25, 2012

(54) MOBILE VIDEO DATING SERVICE

(75) Inventors: Mark Gerald Granat, Bet Shemesh (IL); Itay Tal, Jerusalem (IL)

(73) Assignee: Vringo, Inc., Beit Shemesh (IL)

( * ) Notice: Subject to any disclaimer, the term of this patent is extended or adjusted under 35 U.S.C. 154(b) by 791 days.

(21) Appl. No.: 12/186,547

(22) Filed: Aug. 6, 2008

(65) Prior Publication Data

US 2009/0068995 A1 Mar. 12, 2009

Related U.S. Application Data

(60) Provisional application No. 60/954,074, filed on Aug. 6, 2007.

(51) Int. Cl.
*H04M 3/42* (2006.01)
*H04W 4/00* (2009.01)

(52) U.S. Cl. ..................... 455/414.1; 455/466

(58) Field of Classification Search .................. 455/466, 455/517–519, 418–420, 412.1–412.2, 457, 455/414.1–414.3; 370/328, 338
See application file for complete search history.

(56) References Cited

U.S. PATENT DOCUMENTS

| | | | | |
|---|---|---|---|---|
| 6,594,502 B1* | 7/2003 | Koester | | 455/414.1 |
| 6,665,389 B1* | 12/2003 | Haste, III | | 379/196 |
| 7,085,806 B1* | 8/2006 | Shapira | | 709/203 |
| 7,203,674 B2* | 4/2007 | Cohen | | 1/1 |
| 7,545,784 B2* | 6/2009 | Mgrdechian et al. | | 370/338 |
| 7,801,542 B1* | 9/2010 | Stewart | | 455/518 |
| 7,945,249 B2* | 5/2011 | Fanelli et al. | | 455/412.2 |
| 2004/0122810 A1* | 6/2004 | Mayer | | 707/3 |
| 2007/0162569 A1* | 7/2007 | Robinson et al. | | 709/219 |
| 2007/0280461 A1* | 12/2007 | Du | | 379/201.01 |

OTHER PUBLICATIONS

U.S. Appl. No. 60/771,883, filed Feb. 10, 2006, David Goldfarb et al.
U.S. Appl. No. 60/772,564, filed Feb. 13, 2006, David Goldfarb et al.
U.S. Appl. No. 11/554,938, filed Oct. 10, 2006, David Goldfarb et al.
U.S. Appl. No. 60/816,888, filed Jun. 28, 2006, Jonathan William Medved et al.
U.S. Appl. No. 60/829,896, filed Oct. 18, 2006, David Goldfarb.
U.S. Appl. No. 11/768,989, filed Jun. 27, 2007, Jonathan William Medved et al.
U.S. Appl. No. 60/843,423, filed Sep. 11, 2006, Ariel Yehoshua Kahan et al.
U.S. Appl. No. 11/853,117, filed Sep. 11, 2007, Ariel Yehoshua Kahan et al.

* cited by examiner

*Primary Examiner* — Brandon Miller
(74) *Attorney, Agent, or Firm* — Daniel J. Swirsky; AlphaPatent Associates Ltd.

(57) ABSTRACT

A method includes sending media clips provided by date candidates to a device of a seeker for viewing by the seeker, receiving a selection of a candidate from the seeker device, sending a media clip provided by the seeker to a device of the selected candidate for playing and facilitating a call between the seeker and the candidate if the candidate agrees.

6 Claims, 3 Drawing Sheets

MOBILE VIDEO DATING SERVICE

CROSS-REFERENCE TO RELATED APPLICATIONS

This application claims benefit from U.S. Provisional Patent Application No. 60/954,074, filed Aug. 6, 2007, which is hereby incorporated in its entirety by reference.

FIELD OF THE INVENTION

The present invention relates to presentation of media clips generally and to their presentation with conversations in particular.

BACKGROUND OF THE INVENTION

A ringtone is a sound played on a phone handset, e.g., on a mobile cellular phone, to announce an incoming phone call. A ringtone is typically selected by the player of the phone receiving the call.

A ringback tone is a sound played on a phone handset when calling another phone. Typically, the tone is chosen by the owner of the dialed phone.

A video ringtone or video ringback tone is similar, but uses a video clip rather than an audio sound.

Prior patent applications U.S. 60/771,883 and 60/772,564, and their utility application, U.S. Ser. No. 11/544,938, assigned to the common assignee of the present invention and incorporated herein by reference, define a variation of a video ringtone in which the video clip is chosen by the calling party to be displayed on the called handset.

These patent applications also disclose a community server, an Internet-based server that allows players to choose video clips to be distributed to their friends (or "buddies"). These clips, which may be downloaded at any appropriate time, may be associated with various triggering events and/or various buddies and may be played on the handset when the triggering events associated with the buddies occur.

These patent applications discuss a variety of other opportunities to present a video clip. For example, each might see a video clip at the end of a call between two handsets: one chosen by the player of that phone, or one chosen by the player of the other phone, or one chosen by the Vringo server.

Prior patent applications U.S. 60/816,888, and 60/829,896 and their utility application, U.S. Ser. No. 11/768,989, assigned to the common assignee of the present application and incorporated herein by reference, disclose a method and system for player-provided media content to be uploaded to the community server disclosed in U.S. Ser. No. 11/544,938.

SUMMARY OF THE PRESENT INVENTION

There is provided, in accordance with a preferred embodiment of the present invention, a method including sending media clips provided by date candidates to a device of a seeker for viewing by the seeker, receiving a selection of a candidate from the seeker device, sending a media clip provided by the seeker to a device of the selected candidate for playing and facilitating a call between the seeker and the candidate if the candidate agrees.

Additionally, in accordance with a preferred embodiment of the present invention, the method also includes receiving a save request from at least one of the seeker and the candidate and sending contact details of the seeker and the candidate to each other if both agree to the save request.

Moreover, in accordance with a preferred embodiment of the present invention, facilitating a call includes allocating a temporary phone number to which the devices call.

Alternatively, in accordance with a preferred embodiment of the present invention, facilitating a call includes utilizing a "900" number to which the device dial.

Further alternatively, in accordance with a preferred embodiment of the present invention, facilitating a call includes dialing out to both the devices.

Moreover, in accordance with a preferred embodiment of the present invention, sending a media clip includes sending a SMS message prior to playing the media clip.

Further, in accordance with a preferred embodiment of the present invention, the method also includes receiving a matchmaking indication for a media clip with an indication of a selected target player and sending the media clip to a device of the target player for review by the target player.

Still further, in accordance with a preferred embodiment of the present invention, the method also includes receiving an opinion indication for a media clip with an indication of a selected target player, sending the media clip to a device of the target player for review by the target player and returning an opinion from the target player to the device of the seeker.

Finally, the present invention includes apparatus for implementing the method as well as other methods and apparatus as described hereinbelow.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
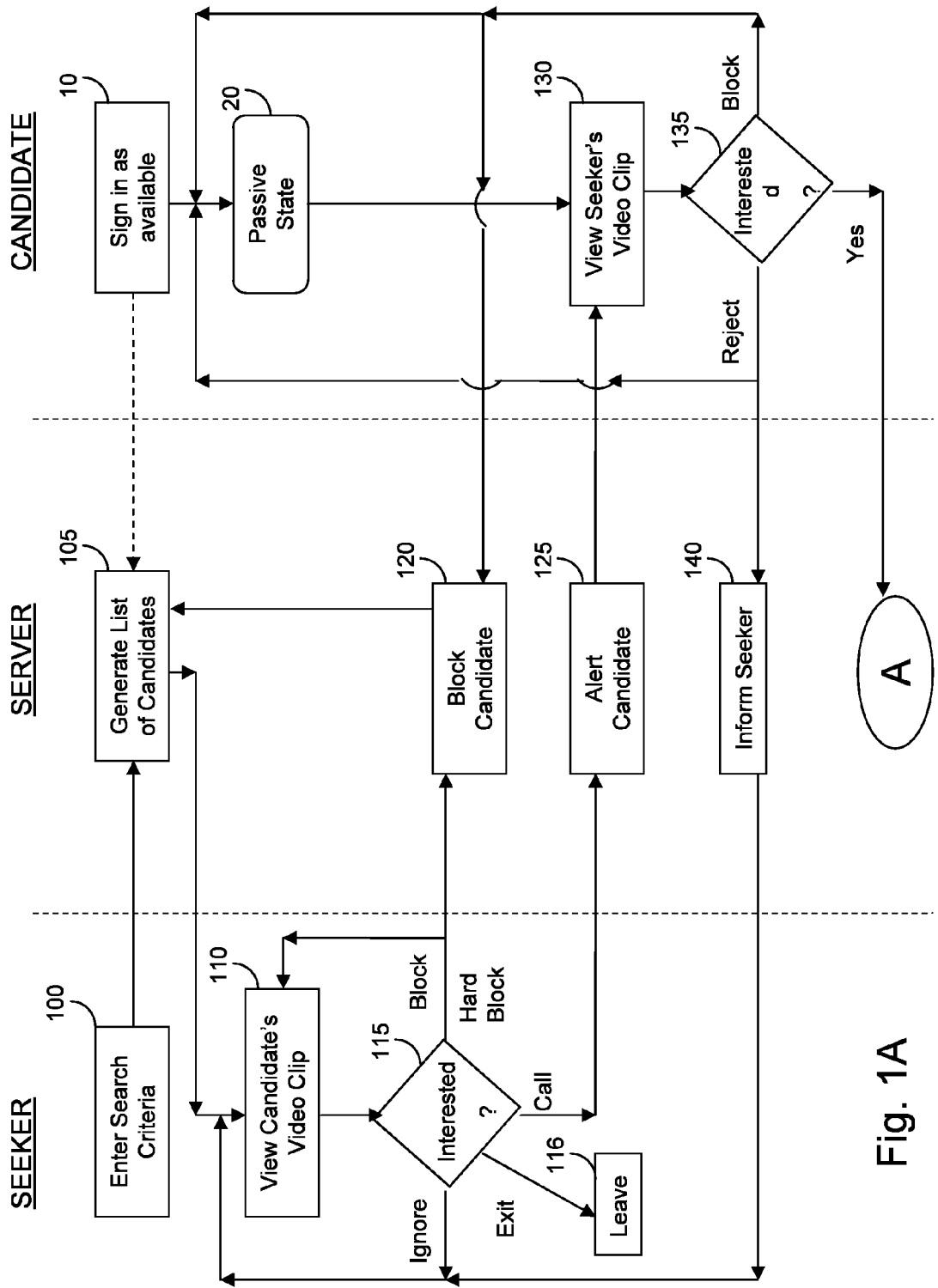
FIGS. 1A, 1B and 1C are flow chart illustrations of the operations of a dating service, constructed and operative in accordance with a preferred embodiment of the present invention.

It may be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it may be understood by those skilled in the art that the present invention may be practiced without these specific details. In other instances, well-known methods, procedures, and components have not been described in detail so as not to obscure the present invention.

The present invention may use video/phone-call interactivity such as that defined in U.S. patent application Ser. No. 11/544,938 to provide dating service functionality.

In the community server system, a player may have one or more personalized video clips that he can "send" to other players on his contact list when he calls them on his mobile phone. He may have a second video clip that any player may see when he is being called by that player, and he may have yet a third video clip that may appear on the other player's screen once the call has been completed.

The present invention may exploit this basic model of video preceding or following a regular voice call to provide a powerful dating game function.

Registration and Setup

A player may register for the service by preparing a short video clip about himself or herself, typically about 15 seconds long. In this clip, the player may attempt to make himself as attractive and interesting a "date" as he can. He may upload his date video to the community server, adding standard dating search criteria possibly including age, location, religion, hobbies, some physical characteristics, profession, income level, current marital status, etc. An uploaded date video is a necessary prerequisite to using the service. Once the video clip has been uploaded, the player may sign into the community server as a "seeker" to look for a date, or may become a "candidate" that may be "found" by a seeker. A player may also sign in as both a seeker and a candidate.

Using the Service

Figure 1B:
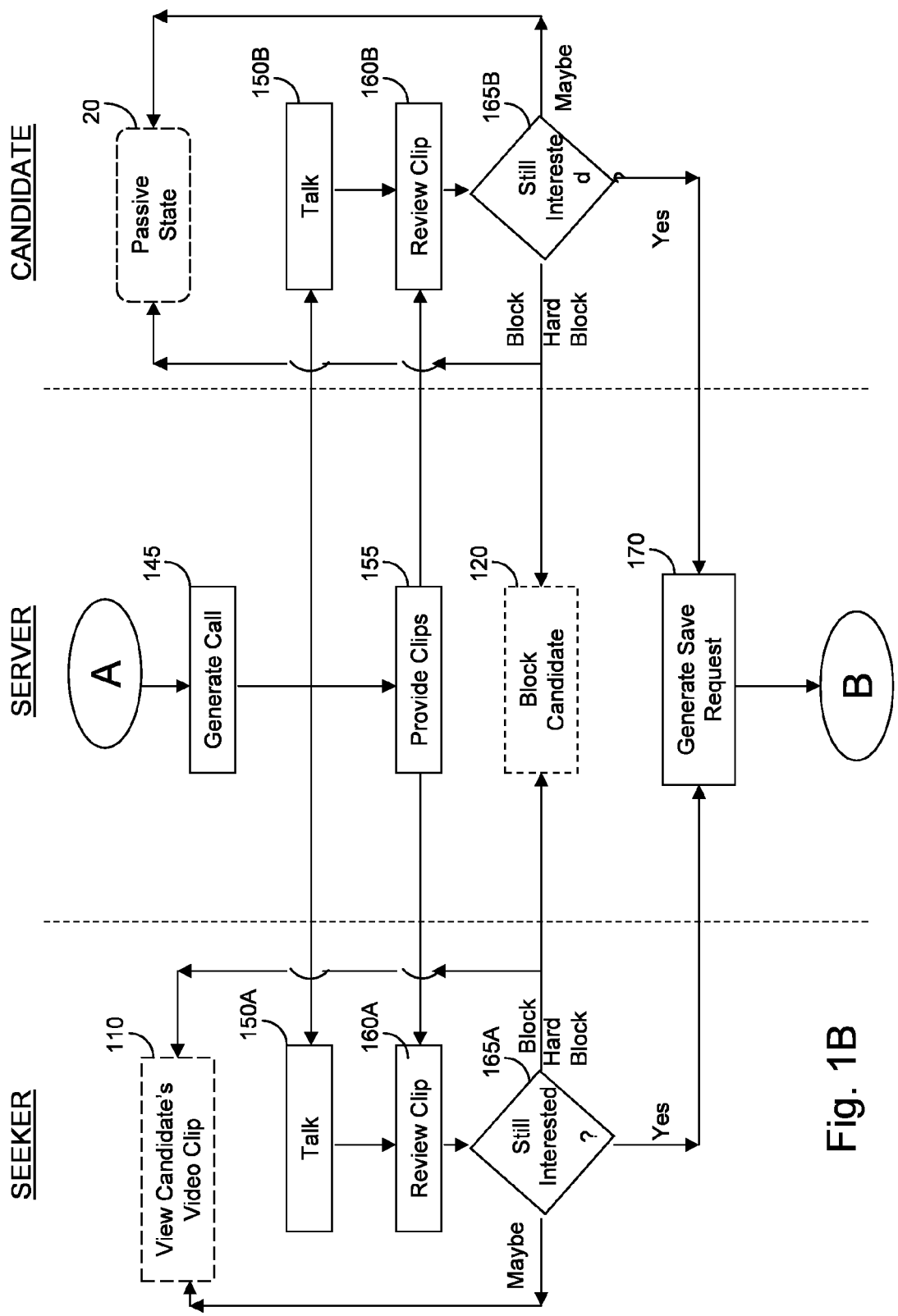
Figure 1C:
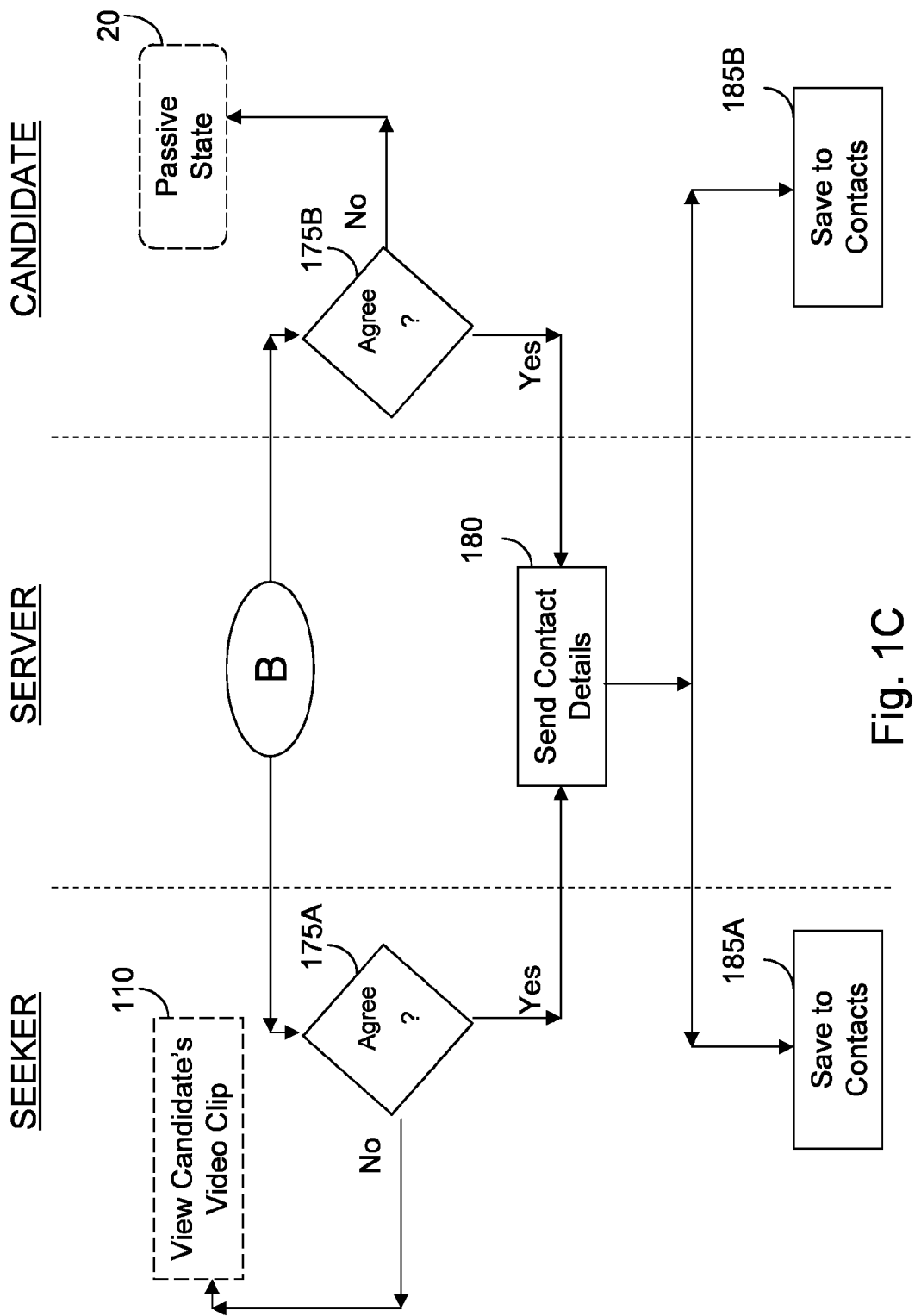

Seekers may actively look for dates. Candidates may wait passively until they are found by a seeker. FIGS. 1A, 1B and 1C, to which reference is now made, outline the activities of a seeker, the community server and a candidate. The description hereinbelow assumes that a pool of candidates has already signed in (step 10) and is waiting in a passive state (step 20) to be contacted by a seeker. For illustrative purposes, the Seeker is referred to as a female, and the Candidate is referred to as a male. It may be appreciated that this is an exemplary embodiment. The present invention may be used by any combination of genders.

Seeking

A player may sign in to seek a date. She may then specify (step 100) search criteria for the dating search, just like in any online dating service. Once the search criteria have been entered and uploaded, the server may generate (step 105) a list of candidates of all the players whose criteria may match the entered search criteria, and who are currently available as candidates. The seeker may begin to view (step 110), one-by-one, the video clips of the available candidates. Each video clip may play several times, for a set period of time, such as about one minute, after which, if the seeker has not made a choice, the clip of the next player may begin to play.

A player who elects to participate concurrently as both a seeker and a candidate may see the videos of others who match the search criteria and, at the same time, her own video may be visible to other seekers whose search criteria she meets.

The server may regularly update the queue of video clips. If, while a player is seeking candidates, other candidates whose criteria match the search criteria of the seeker sign in, then those new candidates' videos may join the queue of videos being sent to the seeker. A seeker may elect to enter new search criteria at any time unless she is in a call, or attempting a call.

Returning to step 110, as a clip plays, the seeker may choose (step 115) one of the following options listed on her screen: ignore, block, hard block, leave and call.

Ignore: The current video does not interest the seeker and she decides she wants to see the next one. Selecting this option ends the current video and the next video in the queue may begin to play as illustrated in step 110. This may also be the default choice if no choice is made.

Block: The seeker really dislikes what she sees about this candidate. This is like "Ignore" except that the candidate whose video has been blocked may never again be seen by this seeker, unless the candidate's video is changed.

Hard Block: May block the candidate even if he changes his video.

It should be noted that candidates may sign in and out while the seeker views videos, and accordingly the server may from time to time regenerate (step 105) the list of candidates. If a candidate is blocked for the seeker, the server may preclude (step 120) the candidate from appearing in subsequent regenerated lists. The next video in the queue may begin to play as in step 110.

Exit: Leave (step 116) the application until the next time the seeker signs in.

Contacting the Candidate

The seeker may like the current video clip and/or may want to contact the current candidate. If so, the seeker may select the call option, which may initiate a request to call the candidate whose video clip is currently being played. The server may alert (step 125) the candidate who then may exit his passive state and may view (step 130) the video clip of the seeker on his screen. Typically the video clip may be displayed for a set period of time, such as a minute.

The candidate may be presented with the following choices (step 135): reject, block or accept.

Reject: If the called candidate is not interested in that particular calling seeker, he will reject the call. In this case, the called candidate returns to passive status (i.e. step 20) and the calling seeker may be informed (step 140) of the rejection. On the seeker's side, the next video clip in the seeker's queue may begin (step 110) to run. The server may require the seeker to wait a period of time before choosing another candidate. Additionally, the seeker may be given a warning if she tries to call a candidate who has already rejected her.

Block: The candidate may reject the call and additionally the seeker may be blocked (step 120). Furthermore, the candidate may not see the blocked seeker's video if the candidate subsequently signs in as a seeker and the blocked seeker meets the former candidate's search criteria. The candidate may return to a passive state (step 20).

Accept: This may initiate a "date" call between the players. It is like a regular telephone call but it may be generated (step 145, FIG. 1B) by the server such that it is anonymous, and no details about the players' real phone numbers may be shared between the players. The seeker and candidate may talk (steps 150A and B) about whatever they wish, exchange contact information, or even arrange to meet.

When the call ends, the server may again provide (step 155) each of the two players with the other's video clip. Each player may again view (steps 160A and 160B) the video clip of the other, for another period of time, such as another minute, and each may be asked if they are still interested (steps 165A and B). The server may present four options, block, hard block, yes and maybe.

Block and Hard Block may operate as described hereinabove.

Maybe: The players are not blocked from each other. The seeker may return to viewing (step 110) video clips, and the candidate may end his active participation and may return to passive mode (step 20). The two players may be willing to meet again and thus, each player may be allowed to appear on the player's next search, provided that they are both logged in.

Yes: If the player indicates Yes to the question of step 165, the server may generate (step 170) a save request, to enable the players to store each other's contact information. The server may send the save request from one player to the second. As shown in FIG. 1C, when such a request is made, the requested player may choose (steps 175A or 175B) between accepting or rejecting the save request.

If the requested player accepts the save request, the server may send (step 180) the relevant contact information to both players, and each of the players may be placed (steps 185A and 185B) on the other player's list of contacts.

If the requested player rejects the save request, neither player may be placed on the other's contact list. The seeker may continue to view (step 110) clips and the candidate may return to a passive state (step 20). If one of the players chose a Block or Hard Block option in response to the 'interested' question of steps 165A or 165B, the server may interpret this as an automatic "Reject Save" if the other player makes a Save Request at the same time.

The conclusion of the Save Request may end the date call and the seeker may now see the next video that meets the search criteria. The candidate may revert to passive mode.

Alerting the Candidate

Prior patent application U.S. 60/843,423 and its utility application Ser. No. 11/853,117, assigned to the common assignee of the present application and incorporated herein by reference, discloses a method for preceding a phone call with the exchange and/or viewing of media content. A notification may be typically pushed to the client device either through IP-based protocols or in some implementations, by using a system SMS message. In accordance with a preferred embodiment of the present invention, the sign-in process for becoming a candidate may include preparing the player's device to receive such a notification.

This method may be incorporated into the present invention in order to alert the candidate and begin playing the seeker's clip.

An audio alert and a message dialog may also be used prior to starting to play the video clip.

Call Generation & Handling

The community server or another suitably configured server may facilitate "anonymous" phone calls between seekers and candidates.

In one embodiment, the server may allocate a temporary phone number (such as a "bridge number") from a pool of available numbers set aside for this purpose. Each player's device may then automatically call into the same bridge number to set up the call. In another embodiment, a "900" number may be allocated which both players then dial manually to set up the call. In a further embodiment, the server may initiate the call directly by dialing out to the devices of both players. An example of a commercially available service of this kind is the click-to-call API of Orange Personal Communications Services Limited, a brand of France Telecom Group.

A number of options are also available to detect the end of a call between a seeker and a candidate (in order to know when to query the participants regarding their continued interested in each other). In one embodiment, a local application may be executed before the call. During the call, this application may go into a standby mode. When the call ends, the application may "wake up" and may continue the processing from the end of the call. Alternatively, a query may be sent to the bridging server which detects when the temporary numbers are returned to the pool.

In an alternatively embodiment of the present invention, a seeker may see a video of a candidate who she doesn't feel is for her, but might be suited to a friend of hers. The seeker may then select a MatchMaker option. She may be shown a list of all her contacts. Selecting one of the contacts then redirects the video to that player. There are three subsequent possibilities.

If the target player is currently signed in as a seeker, the MatchMaker service may interrupt the current video queue at that player, and may show an informative message like "This Matchmaker video sent to you by <Contact Name>".

If the target player is currently signed in as a candidate, the Matchmaker service may start a call at the target's mobile phone, and may shown an informative message like "This Matchmaker video sent to you by <Contact Name>".

If the target player is not playing at all, the MatchMaker service may alert the target player with a message like "You have a MatchMaker alert. Do you want to date?" If the player selects "Yes", he is signed in as a candidate and the scenario continues as in the second option. If he selects "No", the sending player is informed "<Player Name> did not accept your invitation to a date MatchMaker."

Once the target player views the video, he interacts with the video as described hereinabove.

The target also has the MatchMaker option, so conceivably a video may be passed on by many MatchMakers.

The next choice (Call, Ignore, Block or MatchMaker) is reported to the player who made the match, thus: "<Player Name> chose to <call>/<block>/<ignore>/<pass on> the player you just sent", in addition to its other results.

In an alternative embodiment of the present invention, a seeker may want the quick opinion of another friend on her contacts list as to the potential suitability of the video she is currently watching. There is another option available: "Hot or Not" or "Rate!" or something similar.

A seeker viewing another player's video may select the "Hot or Not" option. She may be shown the list of her contacts who are currently signed in. Selecting one of the contacts then redirects the video to that player, (interrupting the current video queue at that player if she is seeking), and may display an informative message like "<Contact Name>" wants you to rate this: "Hot or Not.". The new viewer has one of two choices, Hot and Not. Selecting either of these may cause that choice to display, possibly superimposed on the running video, on the seeker's mobile phone. The contact asked to rate the video need not actually be signed in at the time, but rather may receive the request at a later time.

An important part of this dating system is getting the video right and/or getting the best results from it. So that there is an objective measure of results, a player may be able to access, via the mobile phone, the response rate to her video: the number of calls, ignores and rejects that her video elicited, and the percentage scores. This may be shown alongside the system averages, so that she may understand if her video is better or worse than average, and to what extent. The player may then improve her statistics by making a better video, or better focusing the search criteria, or both. It is envisaged that advice and support as to the creation of high-quality date videos may be a marketable commodity.

ILLUSTRATIVE EXAMPLE

Sonia has just broken up with her boyfriend. She senses that she doesn't get to meet nice guys in the real-life social scene in town: not at work, nor through her hobbies. She wants to meet someone new. Also, she feels that the kinds of offerings she gets from the online dating services don't allow her—or indeed the guys she sees—to express themselves well. The printed word seems to her to be lacking a lot of the personality that both she and the potential partners may project. So she signs up to the Dating Service, where she may use the video to make a more interesting pitch to the potential partner. She makes a video of herself with the help of a friend, concentrating on projecting her vivaciousness as well as the prettiness (that would in any case come across in other media). But she is initially shy. One evening, after she has refined and uploaded her video, she is at home alone and gets her mobile phone to log her in to the server as a candidate. She sets up in an armchair with a book and with her phone on the armrest, and waits. She is tense with excitement. Who may call? May some nice guy out there get a thrill of curiosity from the video she has made? She knows that some guys somewhere in town are now seeking, looking at her video, and deciding whether they like her or not. It is like being at a singles bar but with the advantage of anonymity. She is sure that she may get "picked up" and is also happy that she may politely, anonymously refuse with no hard feelings.

Within fifteen minutes, she gets a date call. She jumps with excitement at what this might herald. She looks at the phone. There is a guy who is good-looking but seems a bit nerdy and awkward. Not for her. She rejects the call and sighs. But not long later there is another call. This guy is hilarious—self-confident, cocky, a great laugh. It hardly matters what he looks like because he is just so interesting. She accepts the call and they talk. For an hour they have a wonderful phone conversation. In particular this guy, whose name is Stefan, has the ability to keep Sonia laughing and laughing. She feels that even if nothing romantic emerges from this, Stefan could be a great friend. At the end of the call she unhesitatingly requests to Save Stefan's phone number, and Stefan accepts.

Unless specifically stated otherwise, as apparent from the previous discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems may appear from the description below. In addition, embodiments of the present invention are not described with reference to any particular programming language. It may be appreciated that a variety of programming languages may be used to implement the teachings of the invention as described herein.

While certain features of the invention have been illustrated and described herein, many modifications, substitutions, changes, and equivalents may now occur to those of ordinary skill in the art. It is, therefore, to be understood that the appended claims are intended to cover all such modifications and changes as fall within the true spirit of the invention.

What is claimed is:

1. A method comprising:
    sending candidate media clips provided by date candidates to a mobile communication device of a seeker for viewing by said seeker;
    receiving a selection of a candidate from said seeker mobile communication device;
    sending a seeker media clip provided by said seeker to a mobile communication device of said selected candidate for playing;
    facilitating a call between said seeker and said candidate if said candidate agrees;
    receiving an opinion indication for a selected media clip with an indication of a selected target player;
    sending said selected media clip to a mobile communication device of said target player for review by said target player; and
    returning an opinion from said target player to said mobile communication device of said seeker.

2. The method according to claim 1 and also comprising receiving a save request from at least one of said seeker and said candidate and sending contact details of said seeker and said candidate to each other if both agree to said save request.

3. The method according to claim 1 and wherein said facilitating a call comprises allocating a temporary phone number to which said mobile communication device of said seeker and said mobile communication device of said candidate call.

4. The method according to claim 1 and wherein said facilitating a call comprises utilizing a "900" number to which said mobile communication device of said seeker and said mobile communication device of said candidate dial.

5. The method according to claim 1 and wherein said facilitating a call comprises dialing out to both said mobile communication device of said seeker and said mobile communication device of said candidate.

6. The method according to claim 1 and wherein each said sending comprises sending an SMS (Short Message Service) message prior to playing any media clip.

* * * * *